United States Patent [19]
Spatafora et al.

[11] Patent Number: 6,050,060
[45] Date of Patent: Apr. 18, 2000

[54] UNIT AND METHOD FOR FORMING A GROUP OF PRODUCTS ON A WRAPPING MACHINE

[75] Inventors: Mario Spatafora, Bologna; Enrico Campagnoli, Sant'Agata Bolognese, both of Italy

[73] Assignee: Azionaria Costruzioni Macchine Automatiche A.C.M.A. S.p.A, Bologna, Italy

[21] Appl. No.: 09/325,643

[22] Filed: Jun. 4, 1999

[30] Foreign Application Priority Data

Jun. 5, 1998 [IT] Italy .................. BO98A0364

[51] Int. Cl.[7] .............. B65B 5/06; B65B 35/50; B65B 35/52
[52] U.S. Cl. ............... 53/447; 53/495; 53/496; 53/541; 414/790.3; 414/795.1
[58] Field of Search ............. 53/447, 541, 496, 53/495, 504; 414/795.1, 790.3

[56] References Cited

U.S. PATENT DOCUMENTS

| | | | |
|---|---|---|---|
| 1,113,932 | 10/1914 | Compton | 53/541 |
| 3,495,374 | 2/1970 | Ebbers et al. | 53/541 |
| 3,815,321 | 6/1974 | Hartman | 53/61 |
| 3,890,764 | 6/1975 | Hartman | 53/61 |
| 4,352,265 | 10/1982 | Hansel et al. | 53/541 |
| 4,957,409 | 9/1990 | Fukao et al. | 414/788.4 |
| 5,193,329 | 3/1993 | Loffredo et al. | 53/473 |
| 5,809,745 | 9/1998 | Reinert | 53/447 |
| 5,823,738 | 10/1998 | Spatafora et al. | 414/795.1 |

*Primary Examiner*—Peter Vo
*Assistant Examiner*—Chris Harmon
*Attorney, Agent, or Firm*—Oblon, Spivak, McClelland, Maier & Neustadt, P.C.

[57] ABSTRACT

A unit and method for forming a group of products on a wrapping machine, whereby a continuous supply conveyor feeds a succession of products to an input of a group-forming screw device; and a step-operated supply device, located at an output of the screw device, is controlled by a sensor for detecting the length of each group, to only feed complete groups to a wrapping unit of the wrapping machine.

10 Claims, 3 Drawing Sheets

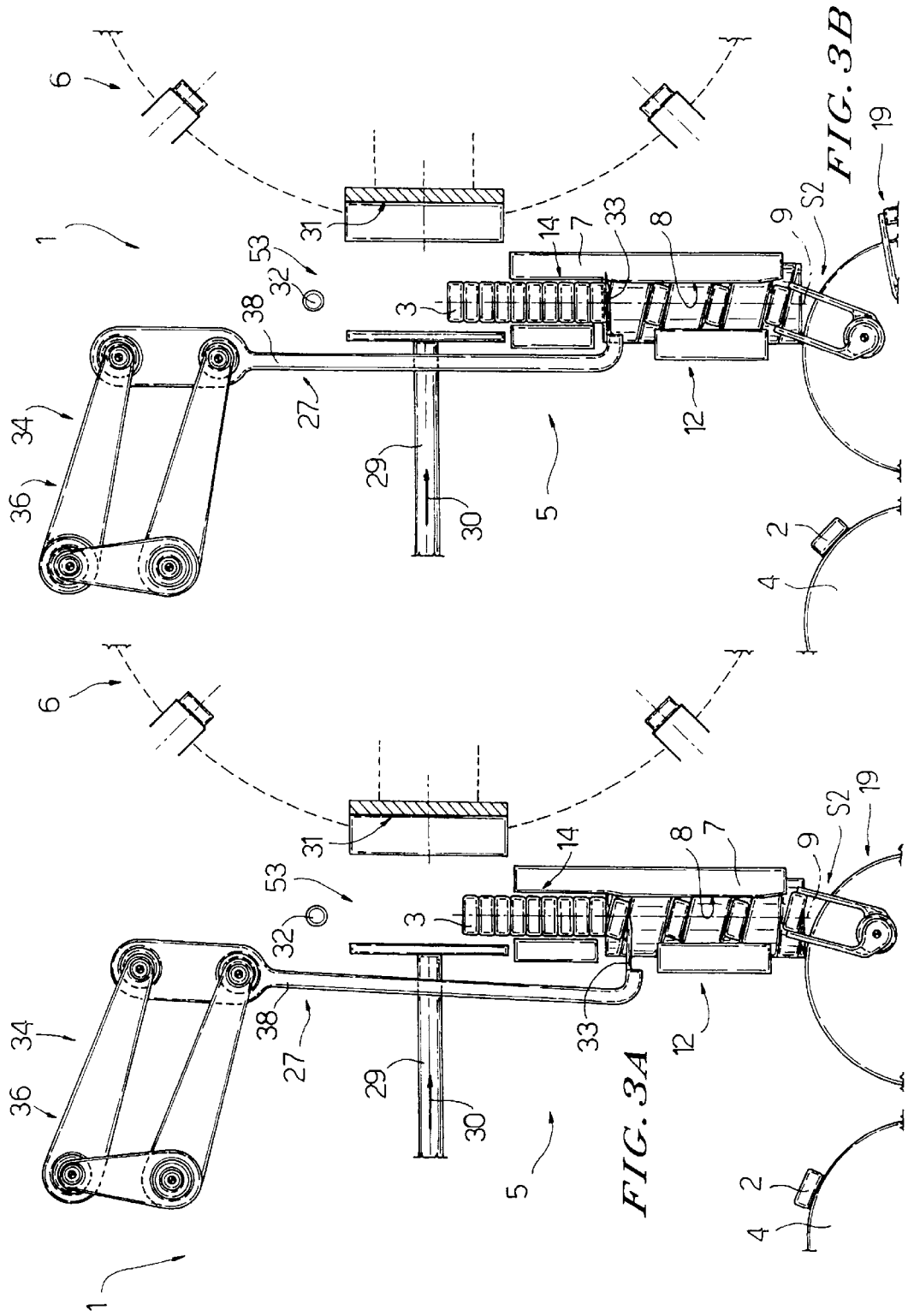

UNIT AND METHOD FOR FORMING A GROUP OF PRODUCTS ON A WRAPPING MACHINE

The present invention relates to a unit for forming a group of products on a wrapping machine.

In particular, the present invention relates to a unit for forming a group of confectionary products, such as sweets, on a wrapping machine for producing "sticks" of sweets, to which the following description refers purely by way of example.

BACKGROUND OF THE INVENTION

Known wrapping machines for producing "sticks" of sweets comprise a unit for forming a normally elongated group of sweets stacked one on top of another.

European Patent EP 677442, for example, describes a unit for forming a group of flat articles, suitable for use on a sweet packing machine, and whereby a continuous supply conveyor feeds a succession of articles to the input of a group-forming screw device through which a reciprocating extracting device slides to cyclically extract and feed the groups of articles from the screw device to a follow-up wrapping unit.

In the all but infrequent event of an incomplete succession of articles being supplied by the conveyor, the screw device produces an incomplete group which, when fed to the follow-up wrapping unit, must be rejected.

Moreover, throughout the time taken to feed the group of articles to the follow-up wrapping unit, the screw device and supply conveyor must be arrested, thus reducing the mean operating speed of the forming unit.

SUMMARY OF THE INVENTION

It is an object of the present invention to provide a unit for forming a group of sweets on a sweet wrapping machine, designed to eliminate the aforementioned drawbacks, and which is straightforward and cheap to produce and, in particular, provides for forming groups of sweets rapidly and in a straightforward manner.

It is a further object of the present invention to provide a unit for forming a group of sweets on a sweet wrapping machine, designed to ensure the formation of complete groups of sweets at all times.

According to the present invention, there is provided a unit for forming a group of products on a wrapping machine, the unit comprising a vertical channel for a stack of products, the channel having a bottom portion and a top portion; a screw device located along said bottom portion and having an input and an output; a supply conveyor for feeding a succession of said products to said input; a sensor for detecting the presence of a complete said group at said output and in said top portion; an extracting device controlled by said sensor to extract the complete said group from a top end of said channel; and a push device moving back and forth in a direction crosswise to said channel to feed the extracted complete said group to a wrapping unit of said wrapping machine.

The present invention also relates to a method of forming a group of products on a wrapping machine.

According to the present invention, there is provided a method of forming a group of products on a wrapping machine, the method comprising the steps of feeding a succession of said products to an input of a screw device located along a bottom portion of a vertical channel; detecting the presence of a complete said group at an output of said screw device and in a top portion of said channel; extracting the complete said group from a top end of said channel; and feeding the extracted complete said group to a wrapping unit of said wrapping machine by means of a push device moving back and forth in a direction crosswise to said channel.

BRIEF DESCRIPTION OF THE DRAWINGS

A non-limiting embodiment of the present invention will be described by way of example with reference to the accompanying drawings, in which:

FIGS. 3a and 3b show the FIG. 2 detail in a further two operating positions.

DETAILED DESCRIPTION OF THE INVENTION

Figure 1:
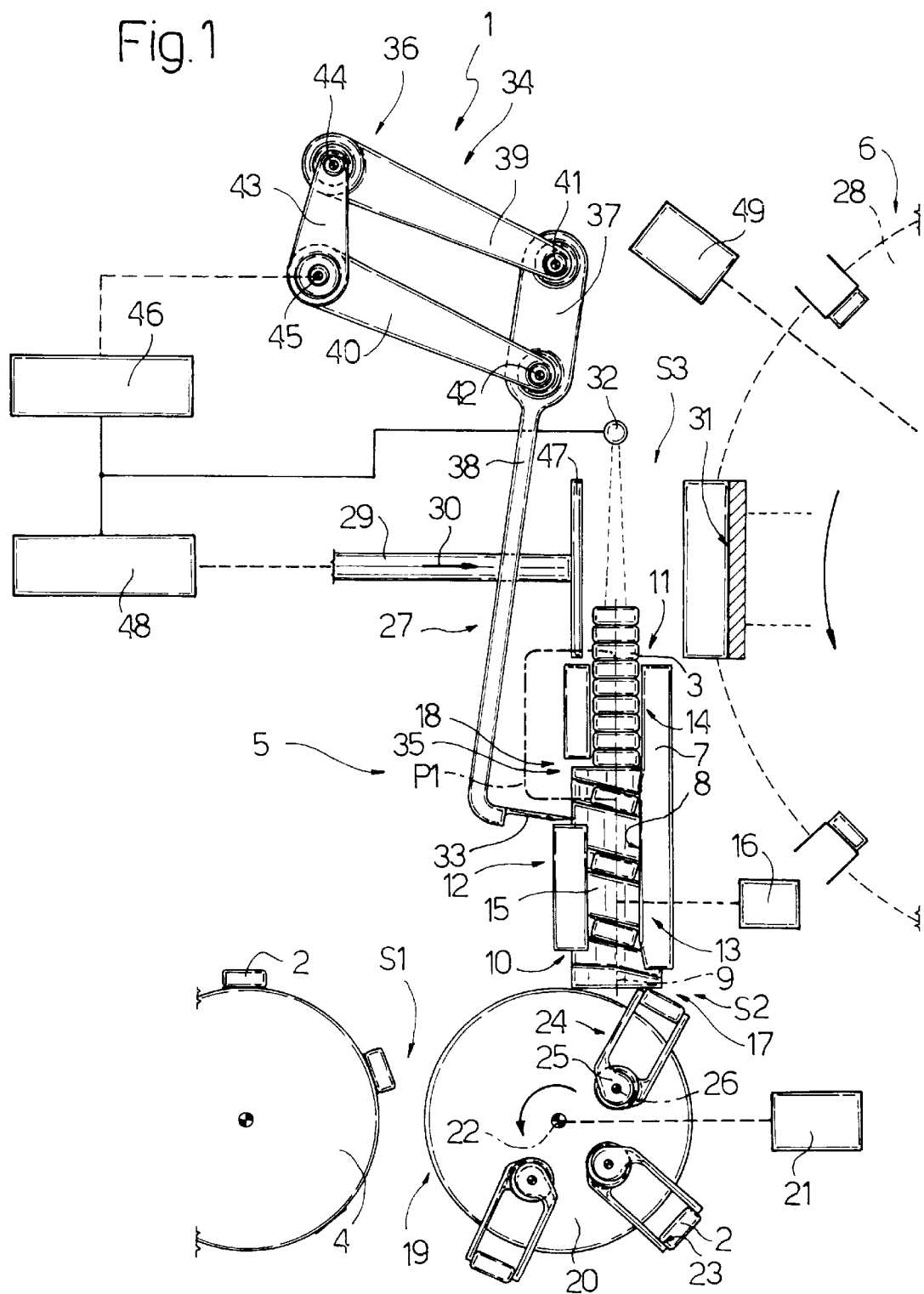
FIG. 1 shows a schematic, partially sectioned view, with parts removed for clarity, of a preferred embodiment of the unit according to the present invention.

Number 1 in FIG. 1 indicates as a whole a machine for wrapping sweets 2, and which provides for wrapping a group 3 of sweets 2 in a sheet of wrapping material (not shown) to form a "stick" (not shown). Each group 3 comprises a predetermined number of sweets 2 stacked one on top of another.

Machine 1 comprises a known conveyor 4 for feeding sweets 2 successively to a stacking unit 5 for forming groups 3 of sweets 2 and feeding groups 3 to a wrapping unit 6.

In a first embodiment, conveyor 4 is an end conveyor of a known transfer unit for receiving sweets 2 directly from a known machine (not shown) on which sweets 2 are produced.

In a further embodiment, conveyor 4 is an end conveyor of a further known wrapping machine for wrapping sweets 2 individually, as described for example in European Patent Application No. 608,823.

Unit 5 comprises a supporting body 7 in which is defined a vertical channel 8 having a respective longitudinal axis 9 parallel to the FIG. 1 plane. The section of channel 8 is so shaped and sized as to enable sweets 2 to slide along channel 8 between an input end 10 and an output end 11 of channel 8.

Channel 8 houses a screw device 12, which divides channel 8 into a bottom portion 13 engaged by device 12 itself, and a free top portion 14. Screw device 12 comprises a pair of known screws 15 (only one shown in the accompanying drawings) arranged side by side and extending parallel to axis 9 to engage respective opposite ends of each sweet 2; and screws 15 are operated continuously and in opposite directions by a drive device 16 to feed sweets 2 along bottom portion 13 of channel 8 and between an input 17 and an output 18 of screw device 12.

Unit 5 also comprises a supply conveyor 19 for receiving sweets 2 successively from conveyor 4 and feeding sweets 2 successively to input 17 of screw device 12.

Supply conveyor 19 comprises a wheel 20 powered by a motor 21 to rotate continuously anticlockwise, in FIG. 1, about a central axis 22 perpendicular to the FIG. 1 plane and crosswise to axis 9. Wheel 20 comprises a number of peripheral seats 23 equally spaced about axis 22 and each for receiving and conveying a respective sweet 2. Each seat 23 is defined by a respective gripping device 24 carried by a respective head 25, which is fitted in rotary manner to wheel 20 and oscillated about a respective axis 26 parallel to axis 22 by a known cam device (not shown).

The rotation of wheel 20 about axis 22 feeds each seat 23 along an endless substantially circular path extending through a loading station S1 at conveyor 4, and through an unloading station S2 at input 17 of screw device 12. As wheel 20 is rotated continuously about axis 22, each seat 23, as sweet 2 is transferred to/from seat 23, is oscillated in known manner about respective axis 26 to face conveyor 4 (input 17) long enough to complete transfer of the sweet.

Unit 5 also comprises an extracting device 27 for extracting a group 3 from top portion 14 of channel 8 and feeding group 3 to a supply station S3 at an input wheel 28 of wrapping unit 6.

Finally, unit 5 also comprises a push device 29 moving back and forth in a direction 30 crosswise to axis 9 to feed a group 3 from station S3 into a corresponding seat 31 on wheel 28; and a sensor 32 for detecting the presence of a complete group 3 at output 18 of screw device 12 and in top portion 14 of channel 8, and for successively activating extracting device 27 and push device 29 to extract the complete group 3 from portion 18 and feed it into corresponding seat 31.

Extracting device 27 comprises an extracting plate 33 lying in plane crosswise to axis 9; and an actuating device 34 connected mechanically to extracting plate 33 to feed plate 33 cyclically along an endless path P1 having a work portion extending along top portion 14 of channel 8 and parallel to axis 9, and a return portion extending outside channel 8. Plate 33 is insertable inside channel 8 and movable along top portion 14 of channel 8 by virtue of a longitudinal opening 35 formed in supporting body 7 and parallel to axis 9.

Actuating device 34 comprises an articulated quadrilateral 36 lying in a plane parallel to the FIG. 1 plane and in turn comprising a connecting rod 37 connected mechanically to plate 33 by an arm 38 and hinged at opposite ends to the ends of two cranks 39 and 40 by means of respective pins 41 and 42 perpendicular to the FIG. 1 plane. The ends of cranks 39 and 40 opposite the ends hinged to connecting rod 37 are in turn hinged to a connecting rod 43 by means of respective pins 44 and 45 parallel to pins 41 and 42. Actuating device 34 also comprises an actuator 46 controlled by sensor 32 and connected mechanically to connecting rod 43 and to crank 40 at pin 45 to move extracting plate 33 along path P1 by means of articulated quadrilateral 36.

Push device 29 comprises a push member 47, which is movable in direction 30 and is moved back and forth by an actuator 48 controlled by sensor 32.

Wrapping wheel 28 is powered by a motor 49 to rotate anticlockwise, in FIG. 1, in steps about a central axis (not shown) parallel to axis 22, and comprises a number of peripheral seats 31 equally spaced about the central axis. The rotation of wheel 28 feeds each seat 31 along an endless path extending through station S3, where seat 31 receives a respective complete group 3 of sweets 2, and through successive known stations (not shown) where seat 31 receives a sheet of wrapping material (not shown) which is folded into a U about group 3. In an alternative embodiment not shown, each seat 31 receives the sheet of wrapping material (not shown) upstream from station S3 and hence before receiving respective group 3.

In actual use, and with reference to FIG. 1, supply conveyor 19 receives sweets 2 from input conveyor 4 and feeds sweets 2 successively to input 17 of screw device 12, which in turn feeds sweets 2 along bottom portion 13 of channel 8 to output 18, where sweets 2 are stacked one on top of another to form a group 3 engaging top portion 14 of channel 8.

As shown in FIGS. 3a and 3b, upon sensor 32 detecting said predetermined number of sweets 2 in group 3 in top portion 14 of channel 8, i.e. upon group 3 reaching a height corresponding to the height of a complete group 3, sensor 32 activates extracting device 27 to extract the complete group 3 from top portion 14 of channel 8 and feed group 3 into supply station S3 at input wheel 28 of wrapping unit 6.

Figure 2:
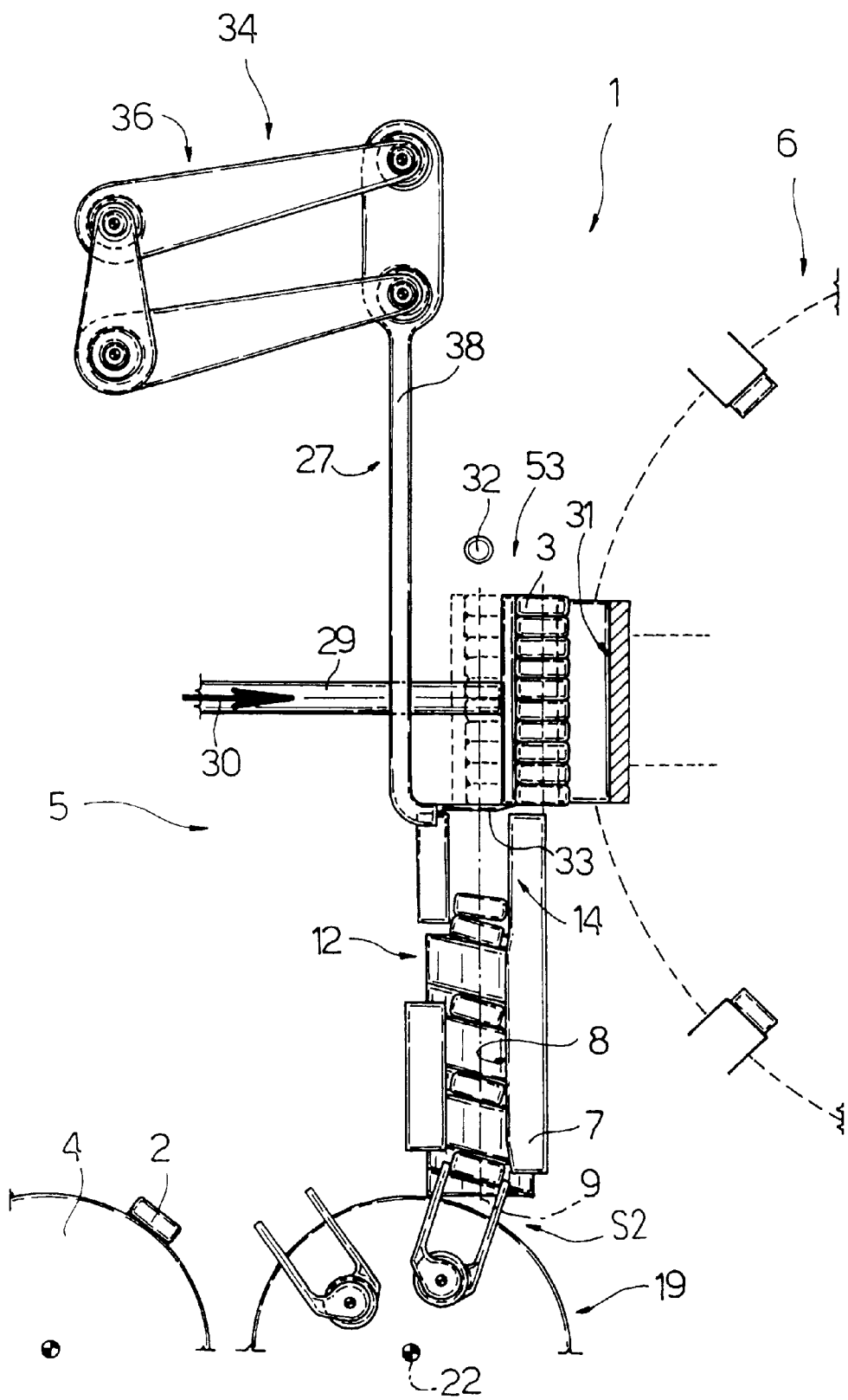
FIG. 2 shows a detail of FIG. 1 in a different operating position.

As shown more clearly in FIG. 2, once the complete group 3 and a corresponding free seat 31 on wheel 28 have been fed into station S3, sensor 32 activates push device 29 to transfer the complete group 3 into corresponding seat 31.

At this point, sensor 32 activates extracting device 27 to restore extracting plate 33 to the initial position (shown in FIG. 1) and so release the output end 11 of channel 8, and the above operating cycle is then repeated.

It should be noted that, as the complete group 3 is being extracted from top portion 14 of channel 8 and fed to corresponding seat 31, formation of the next group 3 in top portion 14 continues, as shown in FIG. 2.

We claim:

1. A unit for forming a group of products on a wrapping machine, the unit (5) comprising a vertical channel (8) for a group (3) of products (2), the channel (8) having a bottom portion (13) and a top portion (14); a screw device (12) located along said bottom portion (13) and having an input (17) and an output (18); a supply conveyor (19) for feeding a succession of said products (2) to said input (17); a sensor (32) for detecting the presence of a complete said group (3) at said output (18) and in said top portion (14); an extracting device (27) controlled by said sensor (32) to extract the complete said group (3) from a top end (11) of said channel (8); and a push device (29) moving back and forth in a direction (30) crosswise to said channel (8) to feed the extracted complete said group (3) to a wrapping unit (6) of said wrapping machine (1).

2. The unit as claimed in claim 1, wherein said extracting device (27) comprises an extracting plate (33); and first actuating means (34) connected mechanically to said extracting plate (33) to move the extracting plate (33) cyclically along the top portion (14) of said channel (8).

3. The unit as claimed in claim 2, wherein said first actuating means (34) move said extracting plate (33) along an endless first path (P1) having a work portion extending along said top portion (14) of said channel (8), and a return portion extending outside said channel (8).

4. The unit as claimed in claim 2, wherein said first actuating means (34) comprise an articulated quadrilateral (36) having a connecting rod (37) connected mechanically to said extracting plate (33).

5. The unit as claimed in claim 1, wherein said supply conveyor (19) comprises at least one seat (23) for receiving a said product (2); and second actuating means (20, 21) for feeding said seat (23) continuously along an endless path extending through said input (17) of said screw device (12) and through a loading station (S1) where said seat (23) receives said product (2).

6. The unit as claimed in claim 5, wherein the second actuating means (20, 21) comprise a wheel (20) rotating about a fixed central first axis (22); and a head (25) fitted to said wheel (20) so as to oscillate about a second axis (26) parallel to said first axis (22); said seat (23) being defined in said head (25).

7. The unit as claimed in claim 6, wherein said seat (23) is defined by a gripping device (24) carried by said head (25).

8. The method of forming a group of products on a wrapping machine (1), the method comprising the steps of feeding a succession of said products (2) to an input (17) of a screw device (12) located along a bottom portion (13) of a vertical channel (8); detecting the presence of a complete said group (3) at an output (18) of said screw device (12) and in a top portion (14) of said channel (8); extracting the complete said group (3) from a top end (11) of said channel (8); and feeding the extracted complete said group (3) to a wrapping unit (6) of said wrapping machine (1) by means of a push device (29) moving back and forth in a direction (30) crosswise to said channel (8).

9. The method as claimed in claim 8, wherein the complete said group (3) is extracted from said channel (8) by feeding an extracting plate (33) along said top portion (14) of the channel (8).

10. The method as claimed in claim 8, wherein, at least before the complete said group (3) is formed, each product (2) inside said top portion (14) is pushed along the channel (8).

* * * * *